United States Patent
Patel et al.

(10) Patent No.: US 7,620,480 B2
(45) Date of Patent: Nov. 17, 2009

(54) COOLING COMPONENTS ACROSS A CONTINUUM

(75) Inventors: Chandrakant D. Patel, Fremont, CA (US); Cullen E. Bash, Los Gatos, CA (US); Ratnesh K. Sharma, Union City, CA (US); Chris G. Malone, Loomis, CA (US); Abdlmonem Beitelmal, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 11/264,786

(22) Filed: Nov. 1, 2005

(65) Prior Publication Data

US 2007/0100494 A1    May 3, 2007

(51) Int. Cl.
*G05D 23/00* (2006.01)
(52) U.S. Cl. .................. 700/276; 700/300; 713/300; 361/695
(58) Field of Classification Search .............. 700/276, 700/277, 299, 300; 713/300; 361/695
See application file for complete search history.

(56) References Cited

U.S. PATENT DOCUMENTS

| | | | |
|---|---|---|---|
| 6,574,104 B2 | 6/2003 | Patel et al. | |
| 6,612,120 B2 | 9/2003 | Patel et al. | |
| 6,834,811 B1 | 12/2004 | Hubrman et al. | |
| 6,904,968 B2 | 6/2005 | Beitelmal et al. | |
| 6,925,828 B1 | 8/2005 | Gerstner et al. | |
| 2004/0141542 A1* | 7/2004 | Sharma et al. | 374/141 |
| 2004/0163001 A1 | 8/2004 | Bodas | |
| 2004/0240514 A1* | 12/2004 | Bash et al. | 374/109 |
| 2005/0024828 A1 | 2/2005 | Espinoza-Ibarra et al. | |

FOREIGN PATENT DOCUMENTS

WO    2004051156 A1    6/2004

OTHER PUBLICATIONS

Patel, C. et al., "Smart Chip, System and Data Center Enabled by Advanced Flexible Cooling Resources", 21st IEEE Semi-Therm Symposium, Mar. 15-17, 2005.*
Patel, C. et al., "Smart Chip, System and Data Center Enabled by Advanced Flexible Cooling Resources", 21st IEEE Semi-Therm Symposium, 2005.

* cited by examiner

*Primary Examiner*—Albert DeCady
*Assistant Examiner*—Steven R Garland

(57) ABSTRACT

A method of cooling components across a continuum having a plurality of levels includes receiving and evaluating detected data related to the components across the continuum. A control scheme is developed based upon the evaluated data, where the control scheme is configured to manipulate one or more actuators across a plurality of levels. In addition, one or more of the actuators across the plurality of levels are manipulated in accordance with the developed control scheme.

12 Claims, 4 Drawing Sheets

COOLING COMPONENTS ACROSS A CONTINUUM

BACKGROUND

A data center may be defined as a location, for instance, a room that houses computer systems arranged in a number of racks. A standard rack, for instance, an electronics cabinet, is defined as an Electronics Industry Association (EIA) enclosure, 78 in. (2 meters) wide, 24 in. (0.61 meter) wide and 30 in. (0.76 meter) deep. These racks are configured to house a number of computer systems, about forty (40) systems, with future configurations of racks being designed to accommodate 200 or more systems. The computer systems typically dissipate relatively significant amounts of heat during the operation of the respective components. For example, a typical computer system comprising multiple microprocessors may dissipate approximately 250 W of power. Thus, a rack containing forty (40) computer systems of this type may dissipate approximately 10 KW of power.

Current approaches to provisioning cooling to dissipate the heat generated by the computer systems are typically based upon temperatures detected at the inlets of air conditioning units. Oftentimes, however, the temperatures detected at the air conditioning unit inlets are not an accurate reflection of the temperatures of the computer systems being cooled. In many instances, therefore, the provisioning of the cooling is based on the nameplate power ratings of all of the computer systems in the data center, with some slack for risk tolerance. This type of cooling provisioning oftentimes leads to excessive and inefficient cooling solutions. This problem is further exacerbated by the fact that in most data centers, the cooling is provisioned for worst-case or peak load scenarios. Since it is estimated that typical data center operations only utilize a fraction of the servers, provisioning for these types of scenarios often increases the inefficiencies found in conventional cooling arrangements.

As such, it would be beneficial to have thermal management that more effectively and efficiently cools the computer systems.

SUMMARY OF THE INVENTION

A method of cooling components across a continuum having a plurality of levels is disclosed. In the method, detected data related to the components across the continuum is received and evaluated. A control scheme is developed based upon the evaluated data, where the control scheme is configured to manipulate one or more actuators across a plurality of levels. In addition, one or more of the actuators across the plurality of levels are manipulated in accordance with the developed control scheme.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring to examples thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

A holistic approach to cooling components in a room is disclosed herein. More particularly, the disclosed method for cooling the components crosses multiple levels of a continuum to achieve one or more policies. By way of example, one or more control schemes may be developed based upon evaluated data indicating that one or more policies are not being met. In addition, the one or more control schemes may be implemented across the continuum.

Figure 1A:
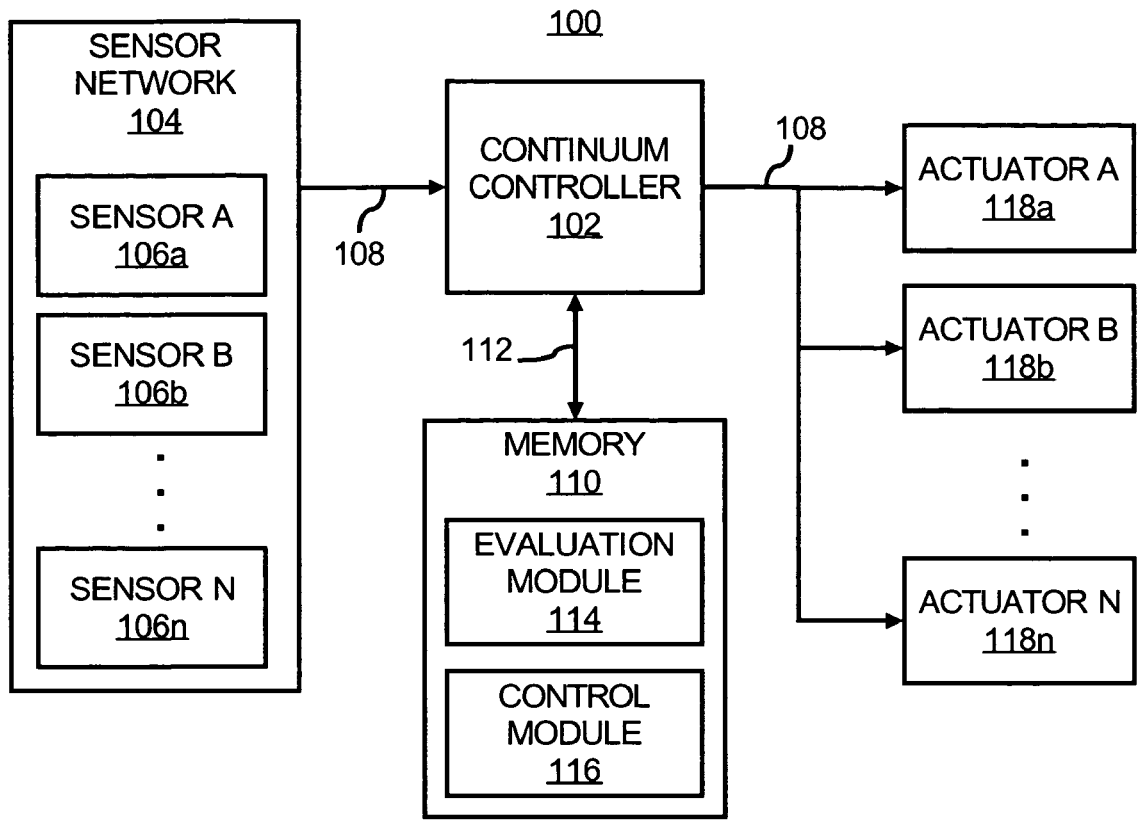
FIG. 1A shows a block diagram of a cooling control system according to an embodiment of the invention.

With reference first to FIG. 1A, there is shown a block diagram of a cooling control system 100, according to an example. It should be understood that the following description of the cooling control system 100 is but one manner of a variety of different manners in which such a cooling control system 100 may be operated. In addition, it should be understood that the cooling control system 100 may include additional components and that some of the components described may be removed and/or modified without departing from a scope of the cooling control system 100.

Generally speaking, and as described in greater detail herein below, the cooling control system 100 is configured to control cooling at multiple component levels in a holistic manner. In other words, the multiple component levels may be considered as a continuum 120 (shown in FIG. 1B) for purposes of control because the cooling control system 100 is configured to control actuators associated with each of the multiple levels under a holistic control scheme. In one respect, the cooling control system 100 may be operated in various manners to substantially increase the compaction and density of components in a room. In addition, or alternatively, the cooling control system 100 may implement one or more algorithms designed to reduce or minimize the amount of energy consumed in cooling the components at a plurality of the multiple levels.

Figure 1B:
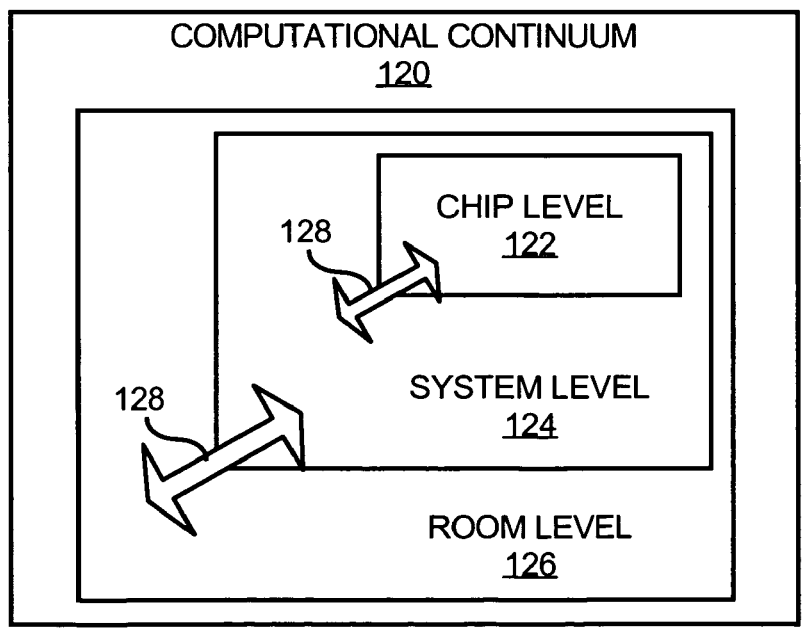
FIG. 1B shows a block diagram of a computational continuum, according to an embodiment of the invention.

The multiple levels in a computational environment may include, for instance, a chip level, a system level, a rack level, a row level, a zonal level, a room level, etc. In FIG. 1B, only a chip level 122, a system level 124, and a room level 126 are shown for purposes of simplicity of illustration. It should, however, be understood that the computational continuum 120 shown in FIG. 1B may include any number of levels as described above. In addition, the arrows 128 generally signify that information and policy assignments may be transferred among the different levels 122-126.

With reference back to FIG. 1A, the cooling control system 100 includes a continuum controller 102 configured to perform evaluation and control operations in the cooling control system 100. Although the continuum controller 102 is depicted as comprising a single device, the evaluation and control operations performed by the continuum controller 102 may be performed by any number of different devices without departing from a scope of the cooling control system 100. In one regard, the continuum controller 102 may comprise a microprocessor, a micro-controller, an application specific integrated circuit (ASIC), and the like, configured to perform the various evaluation and control operations described herein.

The continuum controller 102 is configured to receive input from a sensor network 104. The sensor network 104 includes a plurality of sensors 106a-106n, where "n" is an integer greater than one. The sensors 106a-106n may be positioned to detect one or more conditions, such as, temperature, absolute humidity, pressure, airflow direction, airflow magnitude, etc., at various locations with respect to the continuum 120. More particularly, the sensors 106a-106n may be positioned to detect the one or more conditions at multiple levels 122-126 with respect to the continuum 120. For instance, at least one of the sensors 106a-106n may be positioned to detect a condition around a heat generating component, such as, a processor, a micro-controller, a high-speed video card, a memory, a semi-conductor device, and the like. In addition, another of the sensors 106a-106n may be positioned to detect a condition around a heat generating system, such as, a server, a hard drive, a monitor, and the like. Furthermore, another of the sensors 106a-106n may be positioned to detect a condition at a location in the room housing the components of the continuum 120.

The data pertaining to the conditions detected by the sensors 106a-106n may be transmitted to the continuum controller 102 through a network represented by the arrow 108. The network 108 generally represents a wired or wireless structure in the computing environment for the transmission of data between the various components of the cooling control system 100. The network 108 may comprise an existing network infrastructure or it may comprise a separate network configuration installed for the purpose of controlling cooling by the continuum controller 102. In addition, the sensors 106a-106n and/or the continuum controller 102 may be equipped with or have access to software and/or hardware to enable these devices to transmit and/or receive data over the network 108.

The continuum controller 102 may store the data received from the sensors 106a-106n in a memory 110. The continuum controller 102 may be in communication with the memory 110 through, for instance, a memory bus represented by the arrow 112. However, in certain instances, the memory 110 may form part of the continuum controller 102. Generally speaking, the memory 110 may be configured to provide storage of software, algorithms, and the like, that provide the functionality of the continuum controller 102. By way of example, the memory 110 may store an operating system, application programs, program data, and the like. In addition, the memory 110 may be implemented as a combination of volatile and non-volatile memory, such as DRAM, EEPROM, MRAM, flash memory, and the like. In addition, or alternatively, the memory 110 may comprise a device configured to read from and write to a removable media, such as, a floppy disk, a CD-ROM, a DVD-ROM, or other optical or magnetic media.

The memory 110 may also store an evaluation module 114 and a control module 116, which the continuum controller 102 may implement to control cooling provisioning in the continuum 120. More particularly, for instance, the evaluation module 114 may comprise one or more algorithms that the continuum controller 102 may implement in evaluating the data received from the sensors 106a-106n. By way of example, the evaluation module 114 may be implemented to evaluate the data to determine how one or more actuators 118a-118n, where "n" is an integer greater than one, that affect cooling provisioning may be operated to meet one or more policies.

Examples of suitable policies include, for instance, thermal management based polices, energy efficiency based policies, irreversibility based policies, and performance based policies. Thermal management based policies are generally designed to ensure that proper temperatures are maintained at maximum performance levels. Energy efficiency based policies are designed to substantially optimize energy efficiencies of the devices contained in the computing environment. Irreversibility based policies are designed to reduce the thermodynamic irreversibility of the devices by substantially optimizing flow work, thermodynamic work, and heat transfer. These policies are described in greater detail herein below.

The continuum controller 102 may implement the control module 116 to develop control schemes for operating the actuators 118a-118n across the continuum 120 to achieve or meet one or more of the policies. The control schemes may further be developed according to various policies, such as, operational policies and sustainability policies. Operational policies may be employed to govern the operation of the computational and environmental resources in the continuum 120 at, for instance, the chip, system, and room levels 122-126. In addition, operational policies may prescribe required computational performance, prevent or mitigate failures in the cooling control system, provide thermal management, meet a wide variety of potential user needs, etc. By way of example, operational policies may enable the selection to increase the reaction time to air conditioning failures by having redundancy or lower temperature at the expense of greater energy use.

Sustainability policies may be employed to affect the operational cost of the cooling control system 100 or reduce the effect of the computing resources on the environment in which it is contained by substantially improving operational efficiency and reducing irreversibilities. By way of example, sustainability policies may enable the operation of cooling system s at higher temperatures to save energy at the expense of lower reaction time.

The policies may be weighted according to user needs and priorities and may be dynamic. In addition, or alternatively, the policies may target elements in the continuum 120, such as, individual chips, servers, racks, etc., or the policies may target the continuum 120 as a whole. For instance, the computational performance policies may have more weight at night at the expense of operational cost policies when the cost of electricity is relatively low. Conversely, in the daytime, as the cost of electricity rises, performance policies may have less weight. As another example, the weightings may change with changes in user priorities.

Policies may also be defined to govern the placement of computational workload within the continuum 120 or within computing environments located across the globe. These policies may be based upon sustainability criteria either internally or externally to the computing environments. The mechanism and structure of this type of policy may be based upon a grid computing configuration as described, for instance, in "Energy Aware GRID: Global Service Placement based on Energy Efficiency of the Cooling Infrastructure", authored by Chandrakant D. Patel et al., and published in the ASME International Mechanical Engineering Conference and Exposition, Washington, D.C., USA. An example of an implementation of computational workload placement within computing environments located at various geographic locations is described in co-pending and commonly assigned U.S. patent application Ser. No. 10/820,786, filed on Apr. 9, 2004 and entitled "Workload Placement Among Data Centers Based on Thermal Efficiency", the disclosure of which is hereby incorporated by reference in its entirety.

The continuum controller 102 may transmit or otherwise send instructions pertaining to the developed control schemes to one or more of the actuators 118a-118n. More particularly, for instance, the continuum controller 102 may send instructions to one or more of the actuators 118a-118n to vary conditions affected by the actuators 118a-118n to meet one or more of the policies discussed above. Broadly speaking, the actuators 118a-118n may include any controllable component designed to deliver a given resource, such as, coolant, cooling airflow, cooling fluid, refrigerant, etc., or designed to produce a contaminant, such as, heat, heated airflow, etc. The actuators 118a-118n may also range in size and may be operable to affect cooling and/or heating at the multiple levels of the continuum 120.

At the chip level, for instance, the sensors 106a-106n and the actuators 118a-118n associated with one or more chips may be configured as disclosed in commonly assigned U.S. Pat. No. 6,612,120, entitled "Spray Cooling with Local Control of Nozzles", the disclosure of which is hereby incorporated by reference in its entirety. In addition, or alternatively, the sensors 106a-106n and the actuators 118a-118n associated with one or more chips may be configured as disclosed in commonly assigned U.S. Pat. No. 6,904,968, entitled "Method and Apparatus for Individually Cooling Components of Electronic Systems", the disclosure of which is hereby incorporated by reference in its entirety.

At the system level, for instance, the sensors 106a-106n may comprise temperature sensors positioned at various locations in a server. In addition, the actuators 118a-118n may comprise one or more fans positioned to direct airflow through the server as disclosed in commonly assigned U.S. patent application Ser. No. 10/734,174, Application Publication No. 2005/0128710, entitled "Cooling System for Electronic Components", the disclosure of which is hereby incorporated by reference in its entirety. In addition, or alternatively, the sensors 106a-106n and the actuators 118a-118n may comprise refrigerated cooling components as disclosed in commonly assigned U.S. Pat. No. 7,024,573, entitled "Method and Apparatus for Cooling Heat Generating Components", the disclosure of which is hereby incorporated by reference in its entirety.

At the room level, for instance, the sensors 106a-106n and the actuators 118a-118n may be configured and operated as disclosed in commonly assigned U.S. Pat. No. 6,574,104, entitled "Smart Cooling of Data Centers", the disclosure of which is hereby incorporated by reference in its entirety. As described in that patent, the actuators 118a-118n may comprise one or both of air conditioning units and controllable vent tiles. In addition, or alternatively, the sensors 106a-106n and the actuators 118a-118n may be configured and operated as disclosed in commonly assigned U.S. patent application Ser No. 10/853,529, Application Publication No. 2005/0278070, entitled "Energy Efficient CRAC Unit Operation", the disclosure of which is hereby incorporated by reference in its entirety.

It should be understood that the examples discussed above represent a relatively small number of possible sensor 106a-106n and actuator 118a-118n configurations and operations that may be used by the cooling control system 100. As such, the examples above should be viewed as merely being illustrative and should not be construed as limiting the cooling control system 100 in any respect.

Figure 1C:
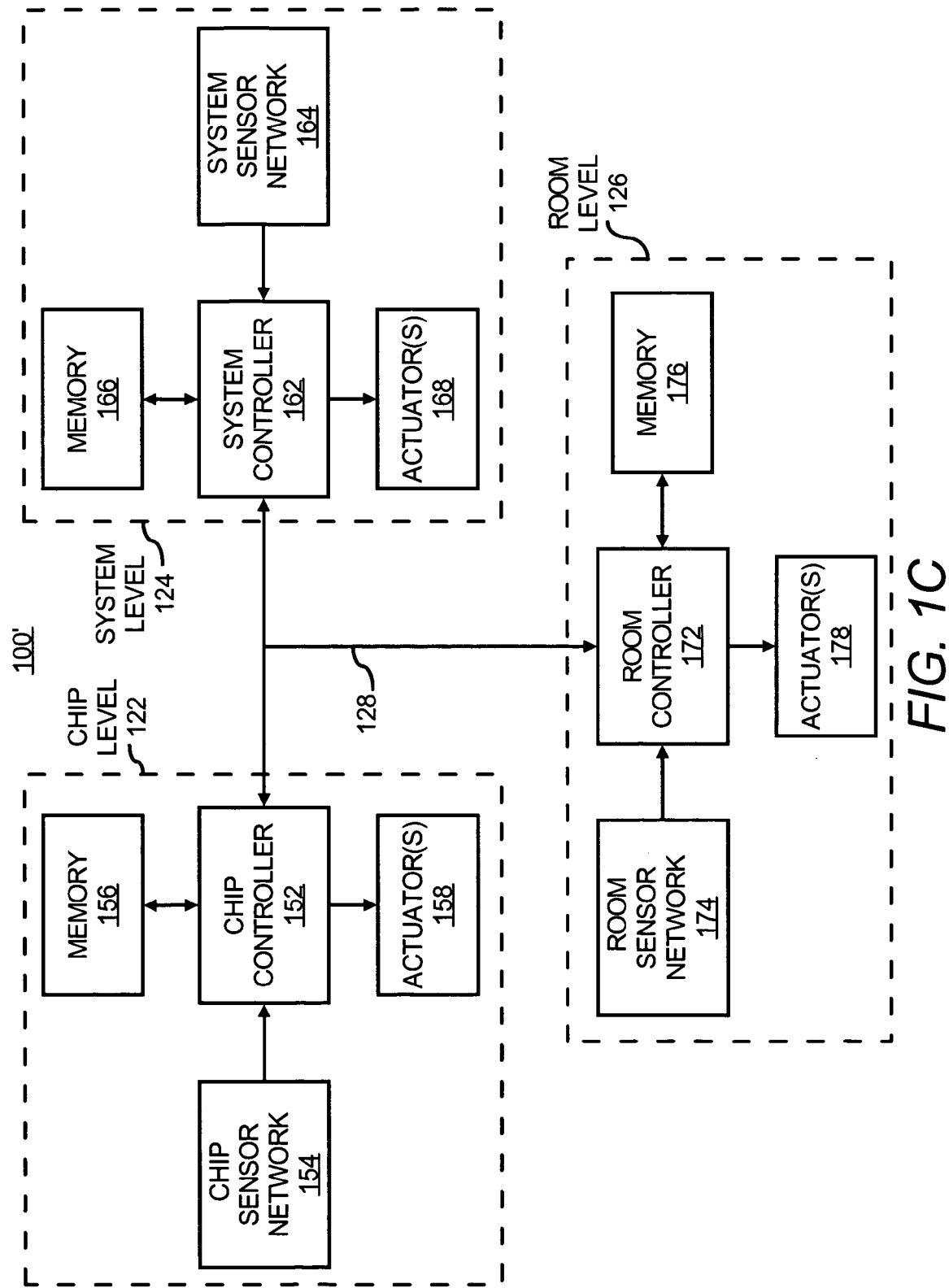
FIG. 1C shows a block diagram of a cooling control system according to another embodiment of the invention.

With reference now to FIG. 1C, there is shown a block diagram of a cooling control system 100', according to another example. As shown, the cooling control system 100' has a relatively different configuration as compared to the cooling control system 100 depicted in FIG. 1A. It should be understood that the following description of the cooling control system 100' is but one manner of a variety of different manners in which such a cooling control system 100' may be operated. In addition, it should be understood that the cooling control system 100' may include additional components and that some of the components described may be removed and/or modified without departing from a scope of the cooling control system 100'.

As shown in FIG. 1C, the cooling control system 100' does not include the continuum controller 102 depicted in FIG. 1A. Instead, the cooling control system 100' is depicted with each of the multiple levels 122-126 of the continuum 120 being in communication with each other. Thus, as described in greater detail herein below, in contrast to the cooling control system 100 depicted in FIG. 1A, information and policies may be transmitted to each other instead of having a centralized controller, such as the continuum controller 102.

Although single ones of the multiple levels 122-126 have been portrayed in FIG. 1C, it should be understood that any reasonably suitable number of the multiple levels 122-126 may be included in the cooling control system 100' without departing from a scope of the cooling control system 100'. In this regard, it should be understood that single ones of the multiple levels 122-126 have been depicted for purposes of simplicity and not of limitation. In addition, it should be understood that levels other than those depicted in FIG. 1C may be included in the cooling control system 100' without departing from a scope of the cooling control system 100'. These levels may include, for instance, a rack level, a row of racks level, a cluster of racks level, etc.

Each of the multiple levels 122-126 includes a respective controller 152, 162, and 172. More particularly, the chip level 122 is depicted as including a chip level controller 152, the system level 124 is depicted as including a system level controller 162, and the room level 126 is depicted as including a room level controller 172. Each of the controllers 152, 162, and 172 may comprise a microprocessor, a micro-controller, an application specific integrated circuit (ASIC), and the like, configured to perform the various evaluation and control operations described herein. In addition, the controllers 152, 162, and 172 may communicate with each other as indicated by the arrows 128.

In one regard, the controller 152, 162, 172 may communicate information pertaining to conditions detected by the sensor network 104 to each other. The sensor network 104 is depicted as being configured to detect one or more conditions at the respective levels 122-126. As shown, the chip level 122 includes a chip sensor network 154 that may comprise one or more of the sensors 106a-106n depicted in FIG. 1A. In addition, the system level 124 includes a system sensor network 164 that may also include one or more of the sensors 106a-106n and the room level 126 includes a room sensor network 174 that may further include one or more of the sensors 106a-106n. Although not shown, one or more of the sensors 106a-106n may form part of more than one of the levels 122-126. In this regard, the conditions detected by one or more of the sensors 106a-106n may be used to evaluate conditions at more than one level 122-126.

Each of the levels 122-126 may also include respective memories 156, 166, 176 configured to provide storage of software, algorithms, and the like, that provide the functionalities of the controllers 152, 162, 172. By way of example, the memories 156, 166, 176 may store operating systems, application programs, program data, and the like. In addition, the memories 156, 166, 176 may each be implemented as a combination of volatile and non-volatile memory, such as DRAM, EEPROM, MRAM, flash memory, and the like. In addition, or alternatively, the memories 156, 166, 176 may each comprise a device configured to read from and write to a removable media, such as, a floppy disk, a CD-ROM, a DVD-ROM, or other optical or magnetic media.

In one regard, the memories 156, 166, 176 may each store algorithms designed to enable the controllers 152, 162, 172 to control respective actuators 158, 168, 178, which may include one or more of the actuators 118a-118n depicted in FIG. 1A. By way of example, the memories 156, 166, 176 may each store one or more algorithms designed to enable the cooling control system 100' to be operated in a holistic manner. In other words, the one or more algorithms stored in the memories 156, 166, 176 may be implemented by their respective controllers 152, 162, 172 based upon one or more of the policies described above, evaluated based upon information obtained from the controllers 152, 162, 172 of each of the levels 122-126.

As such, the controllers 152, 162, 172 may collectively perform various operations of the continuum controller 102 described above. For instance, the controllers 152, 162, 172 may be configured to implement an evaluation module 114 and a control module 116. In addition, the controllers 152, 162, 172 are configured to control their respective actuators 158, 168, 178, based upon data pertaining to a plurality of levels in the continuum 120 and thus implement a holistic control scheme. A description of a manner in which the controllers 152, 162, 172 operate is set forth below with respect to FIG. 2.

Figure 2:
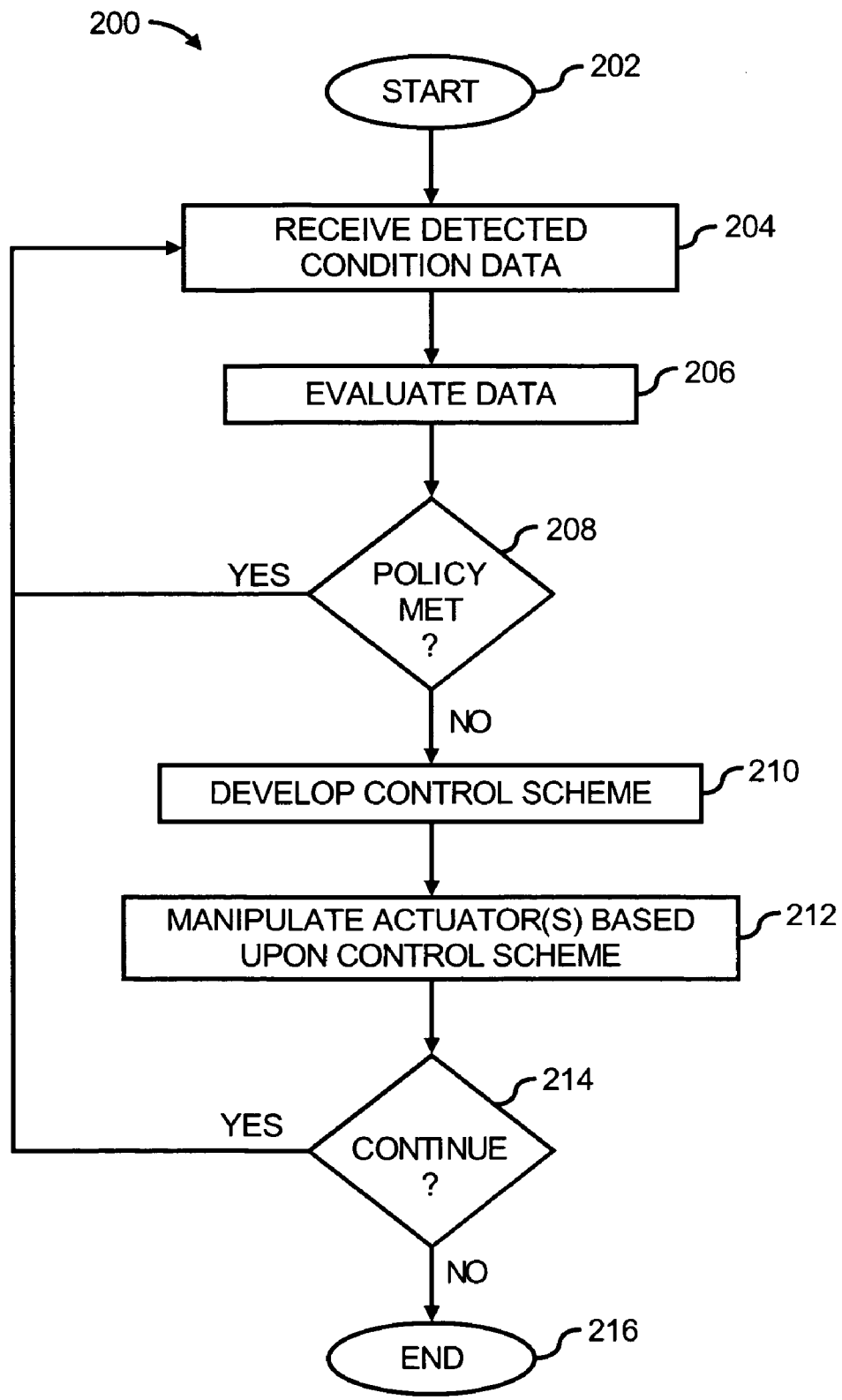
FIG. 2 shows a flow diagram of a method for cooling components across a continuum, according to an embodiment of the invention.

With reference now to FIG. 2, there is shown a flow diagram of a method 200 for cooling electronic components across a continuum 120, according to an example. It is to be understood that the following description of the method 200 is but one manner of a variety of different manners in which an example of the invention may be practiced. It should also be apparent to those of ordinary skill in the art that the method 200 represents a generalized illustration and that other steps may be added or existing steps may be removed, modified or rearranged without departing from a scope of the method 200.

As described above, the continuum 120 is comprised of multiple levels that may include, for instance, a chip level 122, a system level 124, a rack level, a row level, a zonal level, a room level 126, etc. The method 200 may be implemented by the continuum controller 102 or the controllers 152, 162, 172 to evaluate data across the continuum 120. More particularly, the continuum controller 102 or the controllers 152, 162, 172 may evaluate the data to develop one or more control schemes for controlling one or more actuators 118a-118n across the continuum 120. In this regard, the continuum controller 102 or the controllers 152, 162, 172 may control the one or more actuators 118a-118n based upon polices that extend beyond any individual level of the continuum 120. As such, the method 200 may be performed to substantially increase the compaction and density of computer components in a room. In addition, or alternatively, the method 200 may be implemented to substantially reduce or minimize the amount of energy consumed in cooling the components in the multiple levels of the continuum 120.

The description of the method 200 is made with reference to the cooling control systems 100, 100' illustrated in FIGS. 1A and 1C, and thus makes reference to the elements cited therein. It should, however, be understood that the method 200 is not limited to the elements set forth in the cooling control systems 100, 100'. Instead, it should be understood that the method 200 may be practiced in a system having a different configuration than that set forth in the cooling control systems 100, 100'.

The method 200 may be initiated at step 202 in response to any of a number of stimuli or conditions. For instance, the method 200 may be initiated with activation of the components in the room 100, such as, air conditioning units, heat generating components, etc. In addition, or alternatively, the method 200 may be manually initiated or the continuum controller 102 or the controllers 152, 162, 172 may be programmed to initiate the method 200 at various times, for a set duration of time, substantially continuously, etc.

Once initiated, the sensors 106a-106n may detect one or more conditions and data pertaining to the detected one or more conditions may be received by the continuum controller 102, as indicated at step 204. In addition, or alternatively, conditions detected by the sensors 106a-106n of the sensor networks 154, 164, 174 may be communicated to each of the controllers 152, 162, 172 at step 204. The continuum controller 102 or the controllers 152, 162, 172 may implement an evaluation module 114 to evaluate the received data as indicated at step 206. The continuum controller 102 or controllers 152, 162, 172 may evaluate the received data to determine whether one or more policies are being met, as indicated at step 208. If the policies are being met, the continuum controller 102 or controllers 152, 162, 172 may continue to receive and evaluate data as indicated at steps 204 and 206.

If, however, one or more policies are not being met, a control scheme that crosses multiple levels of the continuum 120 may be developed to vary conditions in the computing environment, as indicated at step 210. More particularly, a control scheme configured to control one or more actuators 118a-18n across the continuum 120 to achieve one or more of the desired policies may be developed at step 210.

One of the policies that may be achieved includes thermal management based policies, which are designed to substantially ensure that the heat generating components, such as, servers, computers, disk drives, etc., operate under proper temperature conditions at various performance levels. According to this policy, the provisioning of cooling resources at the multiple levels may be varied to substantially maintain temperatures at desired levels. As such, a control scheme may be developed at step 210 to manipulate one or more of the actuators 118a-118n to substantially ensure that the heat generating components are operating under desired conditions.

Another of the policies may include energy efficiency based policies, which are designed to substantially optimize energy efficiencies of cooling devices, such as, air conditioning units, condensers, fans, etc., contained in the computing environment. The energy efficiency levels of the devices may be determined according to their respective coefficients of performance and a control scheme may be developed at step 210 to manipulate one or more of the actuators 118a-118n to substantially ensure that coefficients of performance of the cooling devices are at desired levels. In a first example, a user may select the energy efficiency needed or desired and the actuators 118a-118n at the multiple levels may be operated accordingly. In a second example, the power on chip and system may be changed by using a power management system to obtain the desired or needed level of energy efficiency.

Another of the policies may include irreversibility based policies, which are designed to substantially minimize the overall irreversibility at the multiple levels of the continuum 120. Irreversibility represents irreversible processes, such as, mixing of hot and cold streams of air. By drawing finite volumes, and using temperatures at various boundaries, the level of irreversibility may be determined, for instance, the difference in temperature between the inlet of a given system and the inlet of a heat generating device, the inlet of a heat generating device to vent tile supply, etc.

Under this policy, a control scheme for the actuators 118a-118n may be developed at step 210 to reduce the thermodynamic irreversibility of the system(s) by optimization of flow work, thermodynamic work and heat transfer. Flow work distributes air judiciously around the room, thermodynamic work compresses the refrigerant to exchange heat at low temperature to high temperature and efficient heat transfer ensures that irreversibilities in the heat exchangers are relatively low. As such, the total irreversibility of the components in the continuum 120 may be represented by:

$$\Sigma\phi = \phi_f + \phi_w \phi_T. \quad \text{Equation (1)}$$

Irreversibilities in flow ($\phi_f$) may occur due to mixing of hot and cold air streams or due to flow expansion and contraction through vents/inlets and across aisles, ceiling space, plenum, etc. Irreversibilities in thermodynamic work ($\phi_w$) may occur due to low isentropic efficiency of the compressor or high friction losses in the cooling cycle. Irreversibilities in heat transfer ($\phi_T$) may occur due to un-optimized heat exchanger design and operation. Irreversibilities in heat transfer ($\phi_T$) may also be reduced by operating the components in the continuum 120 relatively close to the heat rejection temperature or the ambient temperature. The incremental irreversibilities associated with each flow and heat transfer processes are given by:

Equation (2):
$$\delta\phi_f = -mRT_0 \ln\left(\frac{P_{out}}{P_{in}}\right), \text{ and}$$

Equation (3):
$$\delta\phi_T = mCpT_0 \ln\left(\frac{T_{out}}{T_{in}}\right)$$

Where m is the mass flow rate, R is a gas constant, Cp is the specific heat capacity of air, $T_{out}$ is the outlet temperature, $T_{in}$ is the inlet temperature, $P_{out}$ is the outlet pressure, $P_{in}$ is the inlet pressure, and $T_0$ is a reference temperature, and in some cases, the lowest temperature of heat rejection. Since irreversibility is a path variable, total irreversibility is a summation of all the combined values for every significant process in the computing environment of the continuum 120. Processes may be identified based on control volumes created around each key region of transport. A typical process may include, for instance, heat addition in a server or flow of cold air from a vent tile to an inlet of a heat generating device.

Another policy may be performance based, in which, manipulations of the actuators are calculated to substantially improve compute performance at the multiple levels of the continuum 120.

The continuum controller 102 or the controllers 152, 162, 172 may implement the control module 116 to develop control schemes for operating the actuators 118a-118n based upon one or more of the policies evaluated through implementation of the evaluation module 114. The control schemes may be developed according to various policies, such as, operational policies and sustainability policies. Operational policies may be employed to govern the operation of the computational and environmental resources in the computing environment at the chip 122, system 124, and room 126 levels. In addition, operational policies may prescribe required computational performance, prevent or mitigate failures in the cooling control system 100, 100', provide thermal management, meet a wide variety of potential user needs, etc. By way of example, operational policies may enable the selection to increase the reaction time to air conditioning failures by having redundancy or lower temperature at the expense of greater energy use.

Sustainability policies may be employed to affect the operational cost of the cooling control system 100, 100' or reduce the effect of the computing resources on the environment in which the computing resources are contained by substantially improving operational efficiency. By way of example, sustainability policies may enable the operation of cooling systems at higher temperatures to save energy at the expense of lower reaction time.

The policies may also be weighted according to user needs and priorities and may be dynamic. The policies may further target elements in the computing environment, such as, individual chips, servers, racks, etc., or the policies may target the computing environment as a whole. For instance, the computational performance policies may have more weight at night at the expense of operational cost policies when the cost of electricity is relatively low. Conversely, in the daytime, as the cost of electricity rises, performance policies may have less weight. As another example, the weightings may change with changes in user priorities. Policies may further be defined to govern the placement of computational workload within the continuum 120 or within computing environments located across the globe as described above.

At step 212, the continuum controller 102 or the controllers 152, 162, 172 may transmit instructions to one or more of the actuators 118a-118n to vary one or more conditions according to the developed one or more control schemes.

At step 214, it may be determined as to whether the method 200 is to continue. If a "no" condition is reached at step 214, the method 200 may end as indicated at step 216. The method 200 may end, for instance, following a predetermined length of time, following a predetermined number of iterations, manually discontinued, etc. If a "yes" condition is reached at step 214, the method 200 may continue beginning at step 204. As such, the method 200 may be repeated for a number of times to substantially continuously vary the conditions based upon information shared among the continuum 120.

Some or all of the operations illustrated in the method 200 may be contained as a utility, program, or a subprogram, in any desired computer accessible medium. In addition, the method 200 may be embodied by a computer program, which can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 3:
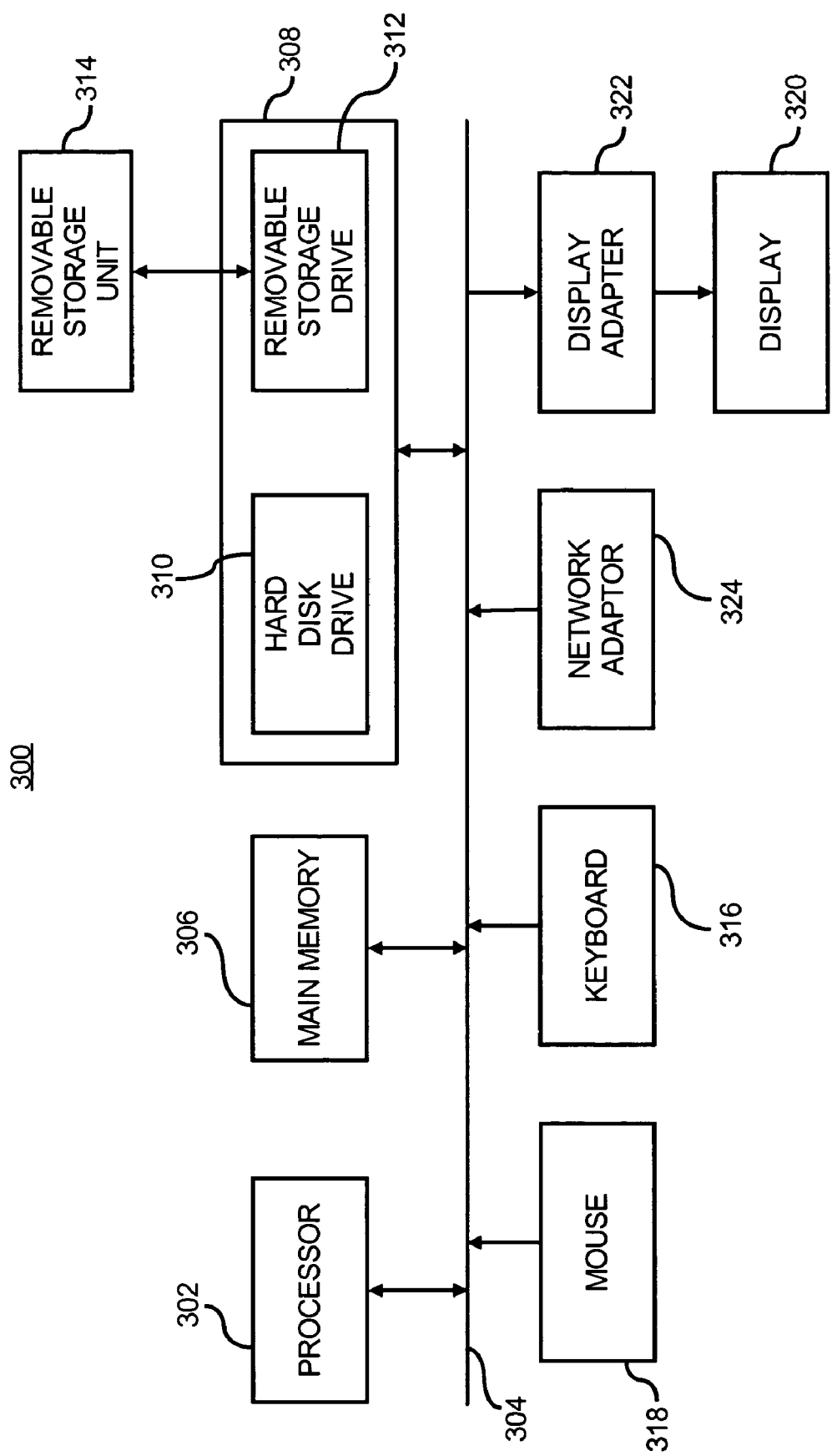
FIG. 3 illustrates a computer system, which may be employed to perform the various functions of the cooling control systems, according to an embodiment of the invention.

FIG. 3 illustrates a computer system 300, which may be employed to perform the various functions of the continuum controller 102 or the controllers 152, 162, 172 described herein above, according to an embodiment. In this respect, the computer system 300 may be used as a platform for executing one or more of the functions described hereinabove with respect to the continuum controller 102 or the controllers 152, 162, 172.

The computer system 300 includes one or more controllers, such as a processor 302. The processor 302 may be used to execute some or all of the steps described in the method 200. Commands and data from the processor 302 are communicated over a communication bus 304. The computer system 300 also includes a main memory 306, such as a random access memory (RAM), where the program code for, for instance, the continuum controller 102 or the controllers 152, 162, 172, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for the environmental control system may be stored.

The removable storage drive 310 reads from and/or writes to a removable storage unit 314 in a well-known manner. User input and output devices may include a keyboard 316, a mouse 318, and a display 320. A display adaptor 322 may interface with the communication bus 304 and the display 320 and may receive display data from the processor 302 and convert the display data into display commands for the display 320. In addition, the processor 302 may communicate over a network, for instance, the Internet, LAN, etc., through a network adaptor 324.

It will be apparent to one of ordinary skill in the art that other known electronic components may be added or substituted in the computer system 300. In addition, the computer system 300 may include a system board or blade used in a rack in a data center, a conventional "white box" server or computing device, etc. Also, one or more of the components in FIG. 3 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of cooling components across a continuum, wherein the continuum comprises a plurality of levels, said method comprising:
   receiving detected data related to the components across the continuum;
   evaluating the detected data to determine whether an irreversibility based policy is being met, wherein the irreversibility policy comprises a policy for reducing a total irreversibility of the components across the continuum, and wherein the total irreversibility comprises a sum of irreversibilities in flow, irreversibilities in thermodynamic work, and irreversibilities in thermal transfer;
   developing a control scheme based upon the evaluated data, said control scheme being configured to manipulate one or more actuators across a plurality of levels; and
   manipulating one or more of the actuators across the plurality of levels in accordance with the developed control scheme.

2. The method according to claim 1, wherein developing a control scheme based upon the evaluated data further comprises developing a control scheme designed to substantially minimize irreversibility of heat exchange at the plurality of levels of the continuum.

3. The method according to claim 1, wherein developing a control scheme further comprises developing a control scheme according to an operational policy designed to govern operation of computational and environmental resources across the continuum.

4. The method according to claim 1, wherein developing a control scheme further comprises developing a control scheme according to a sustainability policy designed to at least one of affect an operational cost of the continuum and reduce the effect of the components on the environment in which the components are contained by improving operational efficiency and reducing irreversibilities.

5. The method according to claim 1, wherein receiving the detected data further comprises receiving the detected data in a continuum controller of the continuum, and wherein evaluating the detected data and developing a control scheme are performed by the continuum controller.

6. The method according to claim 1, wherein receiving the detected data further comprises receiving the detected data in a plurality of controllers, each of said plurality of controllers being assigned to a different level in the plurality of levels, and wherein evaluating the detected data and developing a control scheme are performed by the plurality of controllers.

7. A system for controlling cooling of components across a continuum, said continuum comprising a plurality of levels, said system comprising:
   a sensor network having a plurality of sensors configured to detect at least one condition at the plurality of levels;
   a plurality of actuators configured to vary one or more conditions at the plurality of levels; and
   at least one controller configured to receive condition information from the sensors and to evaluate the received condition information to determine whether an irreversibility based policy is being met, wherein the irreversibility policy comprises a policy for reducing a total irreversibility of the components across the continuum, and wherein the total irreversibility comprises a sum of irreversibilities in flow, irreversibilities in thermodynamic work, and irreversibilities in thermal transfer, said at least one controller being further configured to develop a control scheme to control the plurality of actuators based upon the evaluated condition information to substantially ensure that the irreversibility based policy is being met, and wherein the at least one controller is further configured to control the plurality of actuators at the plurality of levels.

8. The system according to claim 7, wherein the at least one controller comprises a plurality of controllers, each of said plurality of controllers being associated with a different level in the plurality of levels.

9. The system according to claim 7, wherein the at least one controller is configured to develop a control scheme according to an operational policy designed to govern operation of computational and environmental resources of the components across the continuum.

10. The system according to claim 7, wherein the at least one controller is configured to develop a control scheme according to a sustainability policy designed to at least one of affect an operational cost of the continuum and reduce an effect of the components across the continuum on the environment in which the components are contained by improving operational efficiency and reducing irreversibilities.

11. A system for cooling electronic components across a continuum, wherein the continuum comprises a plurality of levels in a computing environment, said system comprising:

means for detecting at least one condition at the plurality of levels;

means for manipulating conditions at the plurality of levels;

means for evaluating whether an irreversibility based policy is being met based upon the at least one condition detected by the means for detecting, wherein the irreversibility policy comprises a policy for reducing a total irreversibility of the electronic components across the continuum, and wherein the total irreversibility comprises a sum of irreversibilities in flow, irreversibilities in thermodynamic work, and irreversibilities in thermal transfer;

means for developing a control scheme to manipulate the means for manipulating in response to a determination that the irreversibility based policy is not being met by the means for evaluating; and means for actuating the means for manipulating according to the control scheme developed by the means for developing.

12. A tangible computer readable storage medium on which is embedded one or more computer programs, said one or more computer programs implementing a method of cooling components across a continuum, wherein the continuum comprises a plurality of levels, said one or more computer programs comprising a set of instructions for:

receiving detected data related to the components across the continuum;

evaluating the detected data to determine whether an irreversibility based policy is being met, wherein the irreversibility policy comprises a policy for reducing a total irreversibility of the components across the continuum, and wherein the total irreversibility comprises a sum of irreversibilities in flow, irreversibilities in thermodynamic work, and irreversibilities in thermal transfer;

developing a control scheme in response to a determination that the irreversibility policy is not being met, said control scheme being configured to manipulate one or more actuators across a plurality of levels; and manipulating one or more of the actuators across the plurality of levels in accordance with the developed control scheme.

* * * * *